United States Patent [19]

Tamura

[11] Patent Number: 5,388,628
[45] Date of Patent: Feb. 14, 1995

[54] PNEUMATIC RADIAL TIRES INCLUDING POLYESTER CARCASS WITH SPECIFIED ELONGATION AND SHRINKAGE

[75] Inventor: Yasuyuki Tamura, Kodaira, Japan

[73] Assignee: Bridgestone Corporation, Tokyo, Japan

[21] Appl. No.: 911,071

[22] Filed: Jul. 9, 1992

[30] Foreign Application Priority Data

Jul. 9, 1991 [JP] Japan ................... 3-193736

[51] Int. Cl.⁶ ............... B60C 9/02; B60C 9/04; B60C 9/08
[52] U.S. Cl. ................. 152/556; 152/451; 156/910
[58] Field of Search ............ 152/451, 556; 57/902, 57/243, 250–251, 258; 264/103, 210.8, 211.14, 211.15; 156/910; 428/375, 378, 395–396

[56] References Cited

U.S. PATENT DOCUMENTS

| | | | |
|---|---|---|---|
| 4,690,866 | 9/1987 | Kumakawa et al. | 428/375 X |
| 4,708,185 | 11/1987 | Imai et al. | 152/451 |
| 4,973,657 | 11/1990 | Thaler | 152/451 X |
| 5,049,339 | 9/1991 | Hrivnak et al. | 264/211.17 X |
| 5,054,174 | 10/1991 | Krenzer | 28/271 |

OTHER PUBLICATIONS

European Search Report dated Oct. 20, 1992 for the equivalent European application number EP 92111581.2.
Database WPIL, No. 83-810 244, Derwent Publications Ltd., London, GB; abstract of JP-A-58-076540.
Database WPIL, No. 89-096 658, Derwent Publications Ltd., London, GB: abstract of JP-A-01-044302.
Database WPIL, No. 89-375 185, Derwent Publications Ltd., London, GB: abstract of JP-A-01-282360.

*Primary Examiner*—Adrienne Johnstone
*Attorney, Agent, or Firm*—Sughrue, Mion, Zinn, Macpeak & Seas

[57] ABSTRACT

When polyester fiber cords having elongations under loads of 0.5 g/d and 2.25 g/d within particular ranges and a heat shrinkage (177° C. 30 minutes) within a particular range are used in a carcass ply of a pneumatic radial tire, the ride comfortability, tire uniformity and tire appearance can simultaneously be improved.

2 Claims, 1 Drawing Sheet

PNEUMATIC RADIAL TIRES INCLUDING POLYESTER CARCASS WITH SPECIFIED ELONGATION AND SHRINKAGE

BACKGROUND OF THE INVENTION

1. Field of the Invention

This invention relates to a pneumatic radial tire having considerably improved ride comfortability, uniformity and side appearance.

2. Disclosure of the Related Art

Heretofore, organic fiber cords such as rayon fiber cords and nylon fiber cords have favorably been used in a carcass of a pneumatic radial tire for passenger cars.

In case of using the rayon fiber cord as a reinforcement of the pneumatic tire, the strength is low as compared with that of the nylon fiber cord, so that if it is intended to manufacture tires based on tire design for safe strength, the amount of the rayon fiber cords used increases to largely increase tire weight and hence the tire performances such as rolling resistance and the like are undesirably degraded. Furthermore, since a raw material for the rayon fiber cord is wood pulp, the use of the rayon fiber cord becomes limited from a viewpoint of problems on resource protection, bad odor produced in the production step, waste treatment and the like.

On the other hand, the nylon fiber cords have a high strength and an excellent fatigue resistance, so that they are fairly used as a reinforcing cord for the tire. However, the satisfactory results are not always obtained in pneumatic radial tires for passenger cars. Because, the nylon fiber cords are low in the modulus of elasticity and large in the creep property, so that when these cords are used as a reinforcement for the tire, the dimensional stability of the tire are poor and the flat spot is undesirably caused.

Lately, polyester fiber cords having a high strength and an excellent dimensional stability are used as a reinforcement for pneumatic radial tires in passenger cars instead of the above rayon and nylon fiber cords. There are proposed many techniques for improving strength, elasticity, shrinkage, heat resistance or fatigue resistance of the polyester fiber cord.

Recently, the tendency for high-grade cars, high user needs and high quality has sharply increased, and it is particularly required to improve a ride comfortability of high-graded cars, reduce an amplitude of vibration or deflection generated through tire nonuniformity (breakage of true circle or the like) and reduce sidewall undulation for a more attractive tire appearance. That is, the above three requirements should be satisfied simultaneously. In case of using the conventionally known polyester fiber cords, however, it is possible to satisfy one or two of the three requirements, but it is impossible to simultaneously satisfy the three requirements.

SUMMARY OF THE INVENTION

It is, therefore, an object of the invention to provide a pneumatic radial tire having improved ride comfortability, small value of radial force variation (hereinafter abbreviated as RFV) indicating a high body sensitivity as a standard of tire uniformity and good appearance without producing sidewall undulation by using the polyester fiber cords as a carcass ply for the pneumatic radial tire.

The inventors have made various studies with respect to the polyester polymer itself; the primary, secondary and high-ordered structure of polyester fiber; and an interrelation between polyester fiber cord and adhesion treatment in order to solve the aforementioned problems as well as a relation of properties of the polyester fiber cord to the above three requirements, and found that each of the three requirements is clear to closely be related to a specific property of the polyester fiber cord as a tire reinforcement, and as a result the invention has been accomplished.

According to the invention, there is the provision of a pneumatic radial tire comprising a tread, a belt arranged inside the tread and a radial carcass comprised of at least one carcass ply, said carcass ply including polyester fiber cords each characterized by having an elongation of not less than 1.2% under a load of 0.5 g/d, an elongation of not more than 6.0% under a load of 2.25 g/d and a dry heat shrinkage of not more than 2.0% under an initial load of 50 g at 177° C. for 30 minutes.

BRIEF DESCRIPTION OF THE DRAWING

The invention will be described with reference to the accompanying drawing, wherein.

DESCRIPTION OF THE PREFERRED EMBODIMENTS

Figure 1:
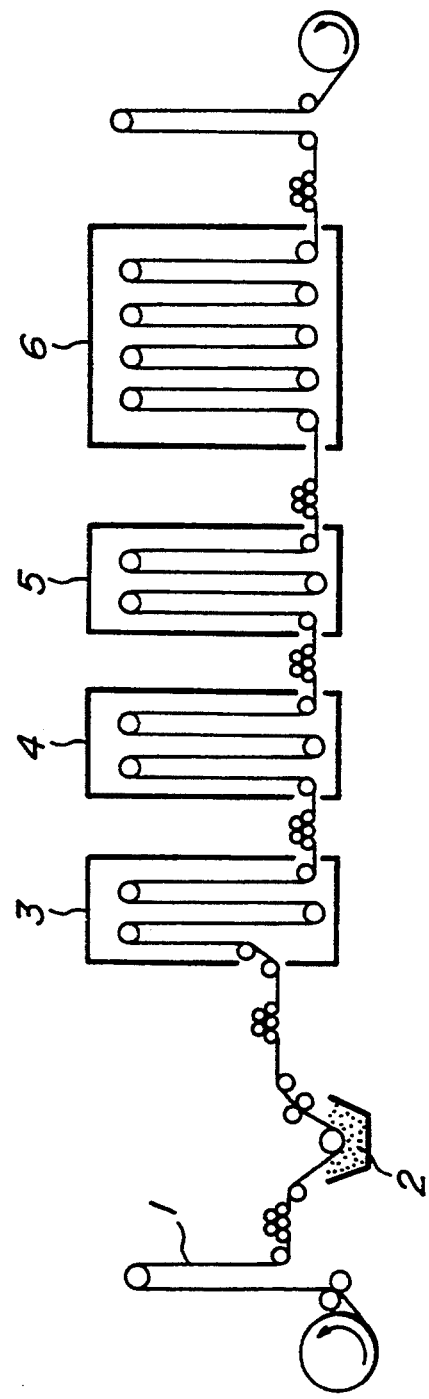
FIG. 1 is a flow diagram showing an adhesive treatment of polyester fiber cords according to the invention.

The polyester fiber cords used as a carcass ply cord in the pneumatic radial tire according to the invention can be produced in the following manner.

The polyester used in the invention is synthesized by reacting an aromatic dicarboxylic acid such as terephthalic acid, isophthalic acid, napthalene 2,6-dicarboxylic acid, sodium 3,5-dicarboxybenzene sulfonate and the like, an aliphatic dicarboxylic acid such as adipic acid, sebacic acid and the like, or an ester thereof with a diol compound such as ethylene glycol, diethylene glycol, 1,2-propylene glycol, 1,4-butane diol, 1,6-hexane diol, neopentyl glycol, cyclohexane 1,4-dimethanol or the like and is preferably a copolymerized polyethylene terlephthalate containing not less than 85 mol % of polyethylene terephthalate. Particularly, the polyester is substantially a polyethylene terephthalate.

At first, raw fibers of the polyester (relative viscosity: 1.51) produced by solid phase polymerization at a yarn production step are rapidly cooled beneath a spinneret in a gas atmosphere of 10°–60° C. in which a spinning rate and a draw ratio are selected from a range of 6000–7000 m/min and a range of 1.20–1.36, respectively.

Then, the thus spun fibers are twisted to obtain a polyester fiber cord of a given twisted structure, which is then subjected to a treatment with an adhesive under the following conditions as shown in FIG. 1. That is, the cords 1 are passed through a tank of an adhesive 2, a drying zone 3, a heat setting zone 4, a normalizing zone 5 and an annealing zone 6 in this order, in which the drying is carried out at 170° C. for 120–160 seconds, and the heat setting is carried out at 250°–258° C. under a cord tension of 0.30–0.80 g/d for 60–80 seconds and the normalizing is carried out at 250°–258° C. under a cord tension of 0.08–0.20 g/d for 60–80 seconds. After the pass through the normalizing zone, the cords have sufficient properties, but when they pass through the annealing zone, more preferable properties are obtained. In the annealing zone, the treating temperature is 140°–170° C. and the treating time is 150–600 seconds.

Then, a pneumatic radial tire for passenger car according to the invention can be manufactured by applying the thus adhesive-treated polyester fiber cords to a carcass ply of the tire according to usual manner of tire building, vulcanization and post cure inflation (PCI). Moreover, the tire structure other than the carcass ply is the same as in the conventionally known radial tire for passenger cars.

As regards the ride comfortability of the radial tire for passenger cars, when the tire rides on protrusions or the like during the running, if the input power is transmitted to the car without mitigation, the shock is large and hence the ride comfortability becomes poor. As a means for mitigating such an input power, there are proposed various prior art methods. In this respect, the invention considers the contribution of the carcass ply material to the ride comfortability. That is, the inventors have found that the properties, particularly modulus of elasticity of the carcass ply material largely acts to mitigate the input power and contributes to improve the ride comfortability.

The term "modulus of elasticity of the carcass ply material" used herein is expressed by an elongation (degree of elongation) corresponding to tension applied to the cord when the tire actually rides over the protrusion under nominal internal pressure and load (internal pressure and load defined by Japan Automobile Tire Manufactures Association), which corresponds to a value represented by elongation under a load of 0.5 g/d in case of the radial tire for passenger car. According to the invention, the elongation under a load of 0.5 g/d is not less than 1.2%, preferably not less than 1.4%. When the elongation under a load of 0.5 g/d is less than 1.2%, the mitigation of the input power can not sufficiently be attained. On the other hand, the upper limit of the elongation under a load of 0.5 g/d is 3.5% because it is technically impossible to hold the elongation under a load of 0.5 g/d at a level of more than 3.5% when the elongation under a load of 2.25 g/d is maintained at a level of not more than 6.0%, As to the above apparently conflicting phenomenon, the inventors have considered the sidewall appearance (undulation) and made further studies and as a result, the following knowledge was obtained.

In the pneumatic radial tire, since a joint portion of the carcass ply is generally a lap joint in the usual tire-building method, the undulation of the outer surface of the sidewall portion may clearly be distinguished at the joint portion even from the exterior. Such an amount of the undulation can be reduced to a certain extent by decreasing the joint amount of the carcass ply, but if the joint amount is too small, the joint may be separated in the course from tire-building to vulcanization according to the usual manner, which causes a safety problem. Therefore, the joint amount should be maintained at a level sufficient to not separate while not producing a distinguishable undulation as mentioned above.

In this respect, the inventors have made studies and found that the undulation amount in the sidewall portion is closely related to the elongation of the carcass ply material in the tire without damaging the ride comfortability of the tire. That is, when the elongation under a load of 2.25 g/d in the carcass ply cord exceeds 6.0%, the undulation of the outer surface of the sidewall portion considerably increases, which is unfavorable in practical use. Therefore, in order to maintain the undulation of the sidewall portion at a quiet level, the elongation under a load of 2.25 g/d is not more than 6.0%, preferably not more than 5.8%, more particularly not more than 5.3%.

As the RFV value showing the nonuniformity of the tire becomes small, the better the uniformity of the tire. The increase of RFV value is mainly caused by breakage of true circle in the tire, scattering of tire weight on the circumference of the tire and the like. If the tire uniformity is poor, vibration or deflection is caused during the running of the tire.

The inventors have also made studies with respect to a relation between RFV value and a property of the carcass ply cord and found that the RFV value is largely dependent upon the heat shrinkage of the carcass ply cord in the vulcanization of the tire.

That is, when the heat shrinkage of the carcass ply cord immediately after the vulcanization is large, the scattering of shrinkage in the carcass ply cords arranged at an angle of 90° with respect to the equatorial plane of the tire increases and hence the true circle of the tire is broken to increase the RFV value. In the invention, the heat shrinkage of the cord at 177° C. under an initial load of 50 g for 30 minutes is not more than 2.0% for preventing the above scattering of shrinkage in the carcass ply cords. Preferably, the heat shrinkage is not more than 1.8%, more particularly not more than 1.1%, which can rapidly reduce the RFV value.

In the conventional polyester fiber cord, there is observed a similar relation to the above relation of the properties of the carcass ply cord to each performance required in the tire of this type as defined in the invention. However, it is impossible to simultaneously satisfy the above three performances required in the tire when the conventional polyester fiber cord is used as the carcass ply cord.

For instance, when the conventional polyester fiber cords are produced so as to have an elongation at 0.5 g/d of not less than 1.2% by spinning, drawing and heat-treating with an adhesive and then used as a carcass ply cord to manufacture a tire in usual manner, the elongation at 2.25 g/d as a carcass ply cord exceeds 6.0%. In other words, in the tire manufactured by using the conventional polyester fiber cords, the ride comfortability is improved, but the undulation from the joint portion of the carcass ply in the sidewall portion undesirably increased. On the other hand, when the conventional polyester fiber cords are produced so as to have an elongation at 2.25 g/d of not more than 6.0%, the elongation at 0.5 g/d is less than 1.2% and also the heat shrinkage exceeds 2.0%.

Further, when the conventional polyester fiber cords are produced so as to have a heat shrinkage of not more than 2.0%, it is impossible to provide the elongation at 2.25 g/d of not more than 6.0%.

As mentioned above, the aforementioned three properties required as a carcass ply cord are conflicting with each other and are not simultaneously satisfied in the conventional polyester fiber cords. That is, these properties are first established in the invention.

The following examples are given in illustration of the invention and are not intended as limitations thereof.

In these examples, the measurement of each property is as follows.

(1) Elongation of cord

The elongations (%) under loads of 0.5 g/d and 2.25 g/d were measured by taking out the carcass ply cord from the tire to remove excessive rubber adhered to the cord with scissors and then stretching the cord at room temperature (25°±2° C.) by means of a constant-speed stretching type tension tester according to a test method of JIS L1017.

Moreover, the denier of fiber before twisting was used as a denier number because the change of denier based on the change of cord length through twisting, adhesion treatment, vulcanization and the like is insignificant. For example, the cord of 1000 d/2 was indicated as 2000 denier.

(2) Heat shrinkage of cord

An initial load corresponding to 1/60 of total denier (e.g. 50 g in case of 3000 deniers) was applied to the carcass ply cord taken out in the same manner as in the above item (1), which was placed in an oven previously held at 177° C. and left to stand therein for 30 minutes and thereafter a length of the cord in the oven was measured. Then, the heat shrinkage was calculated according to the following equation.

Heat shrinkage={(cord length before heat shrink—cord length after heat shrink)/cord length before heat shrink}×100 (%)

(3) Ride comfortability (vibration test when the tire rides over protrusion)

After an iron protrusion (upper side: 19 mm, lower side: 38 mm, height: 9.5 mm) was fixed onto an outer surface of a drum having an outer diameter of 2000 mm, a test tire subjected to an internal pressure of 1.70 kgf/cm$^2$ was trained at a speed of 80 km/hr under a load of 400 kg for 20 minutes. Then, the internal pressure was readjusted to 1.70 kgf/cm$^2$ under no load. Then, the tire was again run on the drum at a speed of 20 km/hr under a load of 400 kg and the speed was increased at a rate of 5 km/hr every one hour, during which an average waveform of axial load fluctuation at a fixing shaft of the tire in the riding over the protrusion was measured at each speed to calculate p—p value.

A direction of the axial load fluctuation at the fixing shaft was a running direction of the car (front and back spring), and a so-called longitudinal stiffness became maximum at a speed region of 30-40 km/hr. Therefore, p—p value (kg) was calculated at this speed region.

The ride comfortability was determined according to the following equation and represented by an index value on the basis that control tire of Comparative Example 1 was 100.

Index of ride comfortability=100+100×{(p—p value of control tire—p—p value of test tire)/p—p value of control tire}

The larger the index value, the better the ride comfortability.

(4) Tire appearance (sidewall undulation)

The undulation of the tire sidewall (at a position corresponding to maximum width in radial direction) was measured over a full periphery in the circumferential direction of the tire by means of a surface roughness meter.

In this case, the tire was subjected to an internal pressure of 2.0 kgf/cm$^2$ in a room of 25°±2° C., left to stand for 24 hours and then the internal pressure was readjusted to 2.0 kgf/cm$^2$. When the measured value exceeded 0.5 mm, the sidewall undulation was visually observed, which came into problem as a tire appearance.

The test tire had a tire size of 165 SR 13 and an internal service pressure (nominal pressure) of 1.7 kgf/cm$^2$. However, the measured pressure was 2.0 kg/cm$^2$ considering the change of temperature and the like.

(5) Tire uniformity (RFV value)

It was measured according to a test method for uniformity of automobile tire described in JASO C607.

In the examples and comparative examples, adhesive-treated polyester fiber cords were used in a carcass ply of a pneumatic radial tire for passenger cars (tire size: 165 SR 13). As to such cords, the spinning and drawing conditions are shown in Table 1, and the adhesive treating conditions are shown in Table 2. Further, the result evaluated on the performances of the test tire are shown in Table 3.

TABLE 1

|  | Condition A | Condition B | Condition C | Condition D |
|---|---|---|---|---|
| Spinning rate (m/min) | 2000 | 4000 | 6000 | 6700 |
| Draw ratio | 2.40 | 1.80 | 1.36 | 1.24 |

TABLE 2

|  | Condition 1 | Condition 2 | Condition 3 | Condition 4 | Condition 5 |
|---|---|---|---|---|---|
| Drying zone |  |  |  |  |  |
| temperature (°C.) | 170 | 170 | 170 | 170 | 170 |
| exposure time (second) | 120 | 120 | 160 | 120 | 120 |
| Heat setting zone |  |  |  |  |  |
| temperature (°C.) | 250 | 258 | 258 | 258 | 258 |
| exposure time (second) | 60 | 60 | 80 | 60 | 60 |
| Normalizing zone |  |  |  |  |  |
| temperature (°C.) | 250 | 258 | 258 | 258 | 258 |
| exposure time (second) | 60 | 60 | 80 | 60 | 60 |
| Annealing zone |  |  |  |  |  |
| temperature (°C.) | — | — | — | 150 | 150 |
| exposure time (second) | — | — | — | 300 | 600 |

TABLE 3(a)

|  | Comparative Example 1 | Comparative Example 2 | Comparative Example 3 | Example 1 | Example 2 | Comparative Example 4 | Comparative Example 5 | Comparative Example 6 | Example 3 | Example 4 |
|---|---|---|---|---|---|---|---|---|---|---|
| Spinning and drawing conditions (Table 1) | A | A | B | C | C | A | A | B | D | C |
| Adhesive treating conditions (Table 2) | 1 | 1 | 1 | 2 | 2 | 1 | 1 | 1 | 3 | 2 |
| Tension of cord [heat setting zone/ normalizing zone] (g/d) | 1.00/0.33 | 0.57/0.19 | 0.30/0.06 | 0.56/0.14 | 0.36/0.09 | 0.40/0.13 | 0.54/0.18 | 1.00/0.20 | 0.50/0.10 | 0.60/0.15 |
| Properties of adhesive-treated cord |  |  |  |  |  |  |  |  |  |  |
| Elongation under | 0.90 | 1.15 | 1.80 | 1.25 | 1.45 | 1.77 | 1.20 | 1.15 | 1.42 | 1.22 |

TABLE 3(a)-continued

| | Comparative Example 1 | Comparative Example 2 | Comparative Example 3 | Example 1 | Example 2 | Comparative Example 4 | Comparative Example 5 | Comparative Example 6 | Example 3 | Example 4 |
|---|---|---|---|---|---|---|---|---|---|---|
| a load of 0.5 g, $\alpha$ (%) | | | | | | | | | | |
| Elongation under a load of 2.25 g/d, $\beta$ (%) | 3.80 | 5.95 | 7.95 | 4.60 | 5.90 | 7.05 | 6.30 | 5.00 | 5.70 | 4.50 |
| Heat shrinkage at 177° C. (under initial load of 50 g for 30 minutes) (%) | 4.00 | 2.30 | 1.20 | 1.90 | 1.35 | 1.75 | 2.10 | 2.30 | 1.10 | 2.00 |
| Tire performances | | | | | | | | | | |
| Ride comfortability (index) | 100 | 101 | 106 | 104 | 105 | 105 | 101 | 101 | 104 | 103 |
| Sidewall undulation (mm) | 0.34 | 0.47 | 0.77 | 0.38 | 0.47 | 0.61 | 0.53 | 0.40 | 0.45 | 0.38 |
| RFV value as uniformity (kg) | 6.2 | 5.2 | 3.1 | 4.6 | 3.5 | 4.4 | 4.8 | 5.3 | 2.8 | 4.8 |

TABLE 3(b)

| | Comparative Example 7 | Comparative Example 10 | Example 5 | Example 6 | Example 7 |
|---|---|---|---|---|---|
| Spinning and drawing conditions (Table 1) | A | B | C | C | D |
| Adhesive treating conditions (Table 2) | 1 | 1 | 2 | 2 | 3 |
| Tension of cord [heat setting zone/ normalizing zone] (g/d) | 0.90/0.31 | 0.60/0.12 | 0.60/0.15 | 0.40/0.10 | 0.44/0.11 |
| Properties of adhesive-treated cord | | | | | |
| Elongation under a load of 0.5 g, $\alpha$ (%) | 0.91 | 1.22 | 1.31 | 1.42 | 1.36 |
| Elongation under a load of 2.25 g/d, $\beta$ (%) | 4.00 | 6.50 | 4.40 | 5.50 | 5.30 |
| Heat shrinkage at 177° C. (under initial load of 50 g for 30 minutes) (%) | 3.80 | 1.60 | 1.80 | 1.15 | 1.10 |
| Tire performances | | | | | |
| Ride comfortability (index) | 100 | 103 | 104 | 105 | 104 |
| Sidewall undulation (mm) | 0.34 | 0.52 | 0.38 | 0.44 | 0.42 |
| RFV value as uniformity (kg) | 6.2 | 4.0 | 4.4 | 3.3 | 2.8 |

As seen from Table 3, the adhesive-treated polyester fiber cords satisfying all features of the invention are a combination of condition C in Table 1 with condition 2 in Table 2, a combination of condition D in Table 1 with condition 3 in Table 2, a combination of condition C in Table 1 with condition 4 in Table 2 and a combination of condition C in Table 1 with condition 5 in Table 2, respectively.

That is, the conventional adhesive-treated polyester fiber cords of the comparative examples are produced by using a relatively mild spinning rate of 2000-4000 m/min as shown in conditions A and B of Table 1 as well as a low temperature of 240°-250° C. as shown in condition 1 of Table 2. On the other hand, the adhesive-treated polyester fiber cords according to the invention are produced by using a super-high spinning rate of 6000-6700 m/min as shown in conditions C and D of Table 1 as well as a high temperature near to a melting point of the conventional polyester, e.g. 255°-260° C. as shown in conditions 2 and 3 of Table 2. Since the super-high speed spun fibers are microscopically large in the crystal size and high in the melting point, they are technically possible to be treated at a higher temperature for a longer time as compared with the conventional fibers, which is particularly effective for improving heat shrinkage and the like. Further, as shown in conditions 4 and 5 of Table 2, the heat treatment is carried out in the annealing zone after the condition 3. In this case, the cord tension is selected within a range of 0.03-0.20 g/d.

Thus, all of the properties of the cord required in the invention are more improved.

When Examples 1 and 2 are compared with Comparative Examples 1-3, the elongation $\alpha$ of the cord under a load of 0.5 g/d is remarkably related to the ride comfortability as seen from Table 3. That is, when the elongation $\alpha$ is less than 1.2%, the ride comfortability is poor, while when it is not less than 1.2%, the ride comfortability is improved.

Moreover, Comparative Example 3 shows a good ride comfortability, but the elongation $\beta$ of the cord under a load of 2.25 g/d becomes too large and hence the sidewall undulation undesirably increases. On the other hand, in Examples 1 and 2, the sidewall undulation and RFV value are low, so that the three requirements are simultaneously improved.

When Examples 3 and 4 are compared with Comparative Examples 4-6, the elongation $\beta$ is remarkably related to the sidewall undulation. As previously mentioned, when the sidewall undulation exceeds 0.5 mm, the undulation is visually distinguishable, so that the sidewall undulation is practically required to be less than 0.5 mm. From these examples, it is apparent that when the elongation $\beta$ exceeds 6.0%, the sidewall undulation exceeds 0.5 mm. In Comparative Example 6 using the conventional adhesive-treated polyester fiber cords, only the sidewall undulation can be suppressed, but the ride comfortability and tire uniformity are degraded. In Examples 3 and 4, there are caused no degradation of tire performances as in Comparative Example 6.

Examples 5-7 and Comparative Examples 7-10 show a relation between the heat shrinkage of the cord and the RFV value of the tire.

In Comparative Examples 7-9 having the heat shrinkage of more than 2.0%, the RFV value as a tire uniformity exceeds 5 kg and there is feared an occurrence of vibration or deflection during the running of the tire. On the other hand, when the heat shrinkage is not more than 2.0%, there is a tendency of rapidly lowering the RFV value. Particularly, Example 7 shows the RFV value of about 2 kg, which is not observed in the conventional cord, and maintains very good level on the ride comfortability and sidewall undulation.

As mentioned above, in the pneumatic radial tire for passenger car according to the invention, the ride comfortability, tire uniformity (RFV value) and tire appearance (sidewall undulation) can simultaneously be improved by using particular polyester fiber cords satisfying all requirements as a carcass ply cord.

What is claimed is:

1. A pneumatic radial tire comprising a tread, a belt arranged inside the tread and a radial carcass comprised of at least one carcass ply, said carcass ply including polyester fiber cords each characterized by having an elongation of not less than 1.2% under a load of 0.5 g/d, an elongation of not more than 6.0% under a load of 2.25 g/d and a heat shrinkage of not more than 2.0% under an initial load of 50 g at 177° C. for 30 minutes.

2. The pneumatic radial tire according to claim 1, wherein said elongation under a load of 0.5 g/d is not less than 1.4%, and said elongation under a load of 2.25 g/d is not more than 5.8%, and said heat shrinkage is not more than 1.8%.

* * * * *